Feb. 20, 1923.
C. R. PRATT,
CHUCK,
FILED JUNE 4, 1920.
1,446,063.
5 SHEETS—SHEET 3.
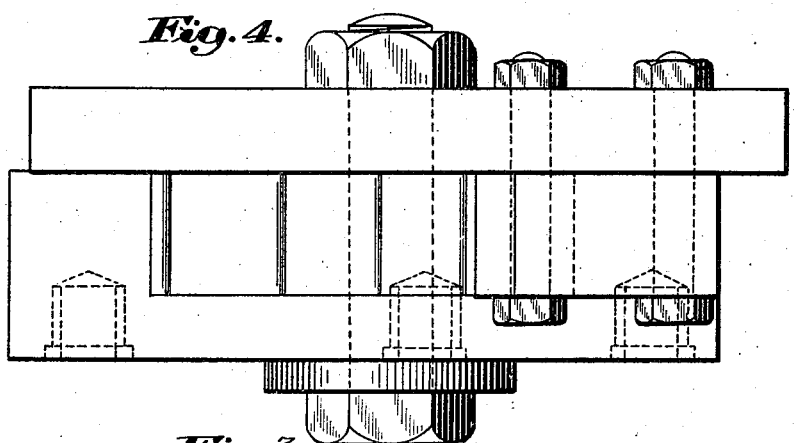
Fig. 4.
Fig. 3.
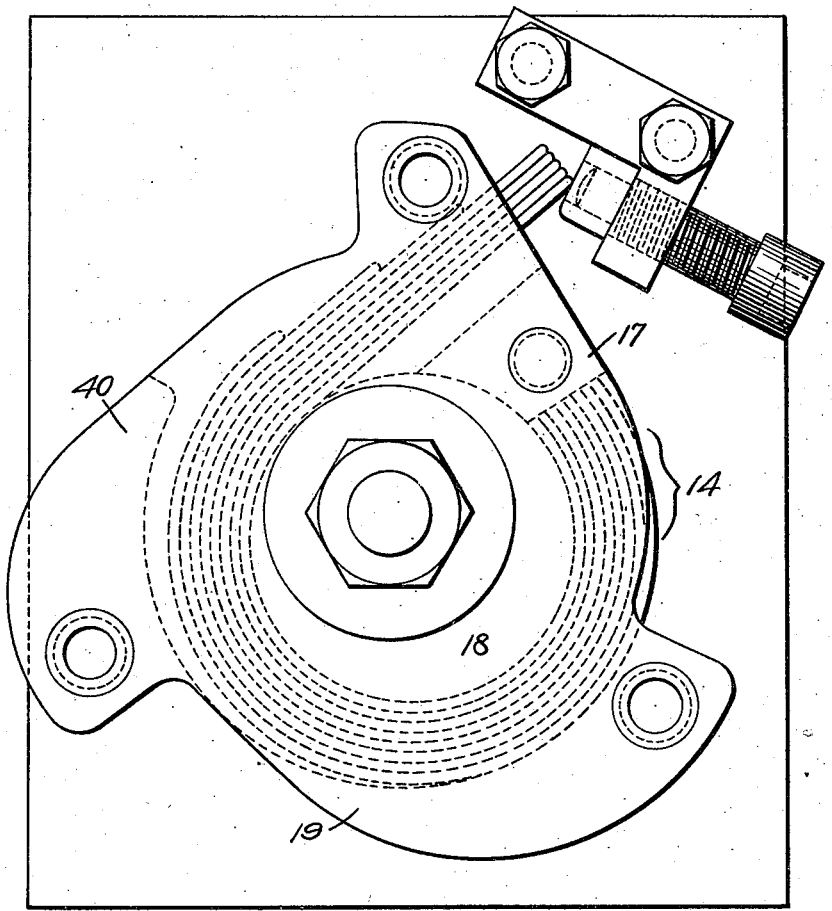
Inventor:
Charles R. Pratt,

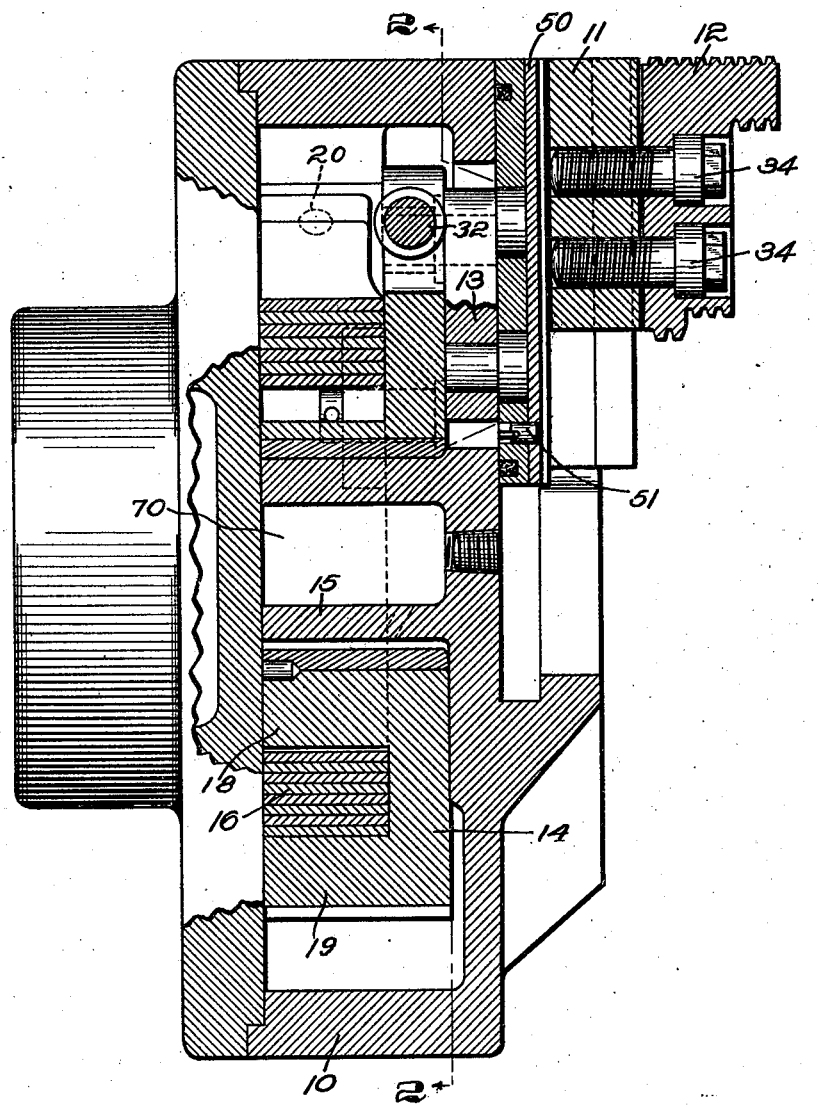

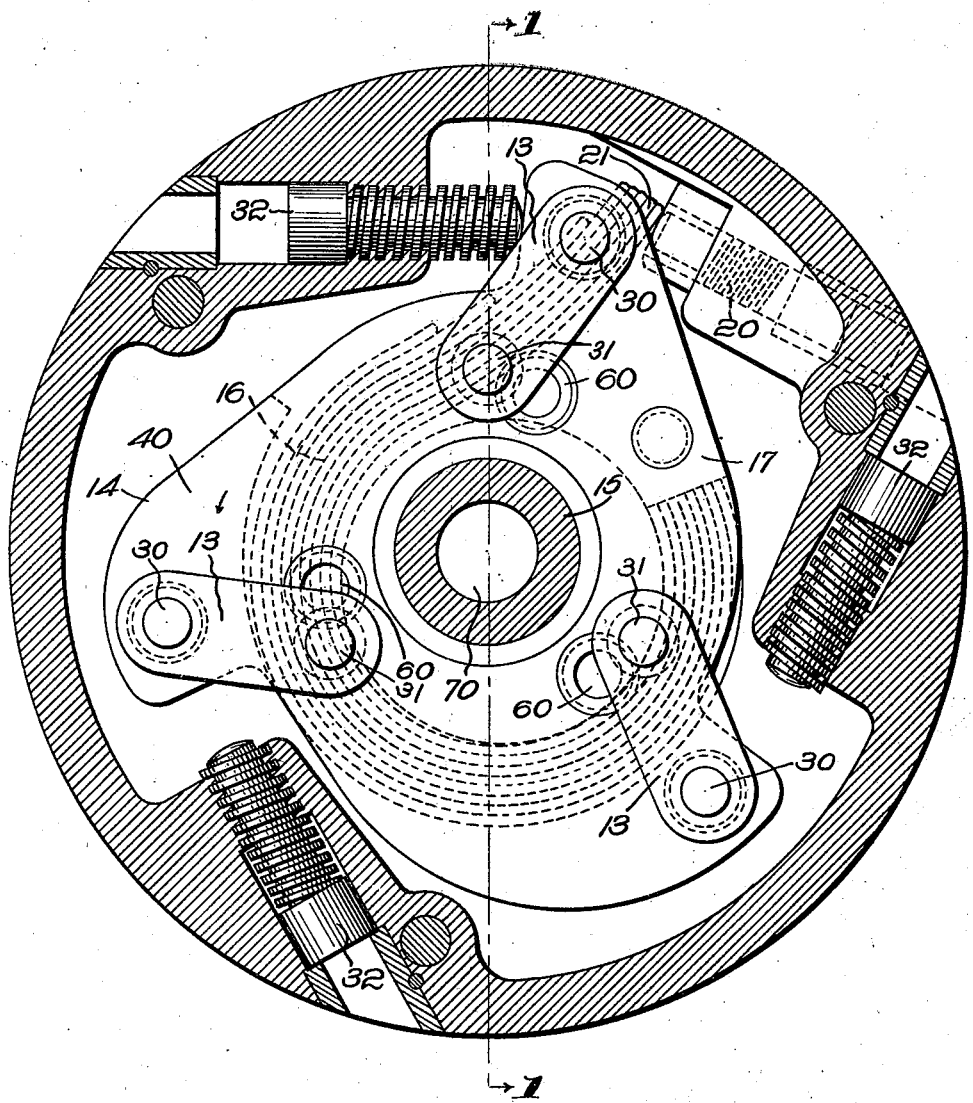

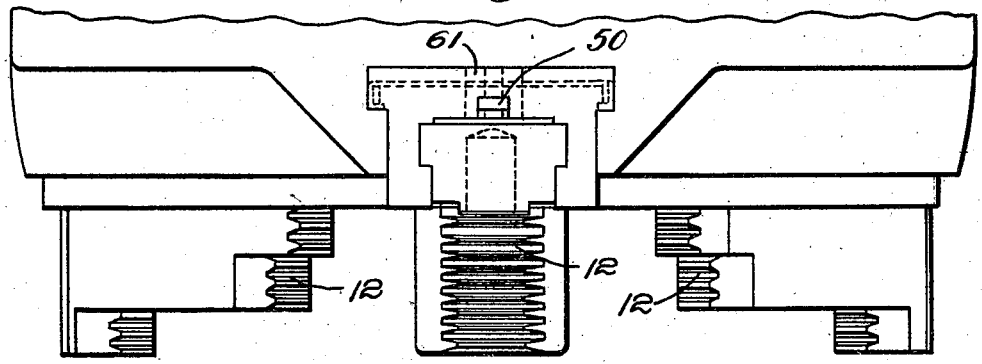
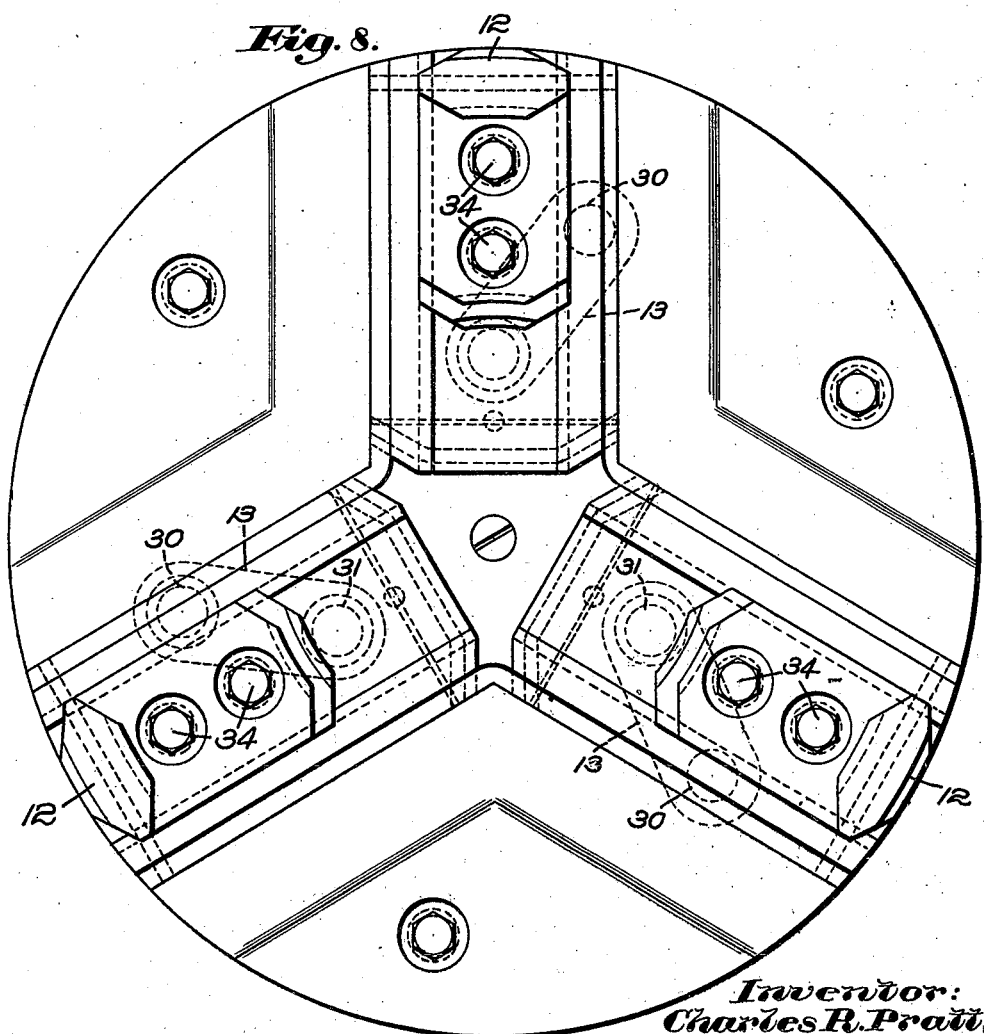

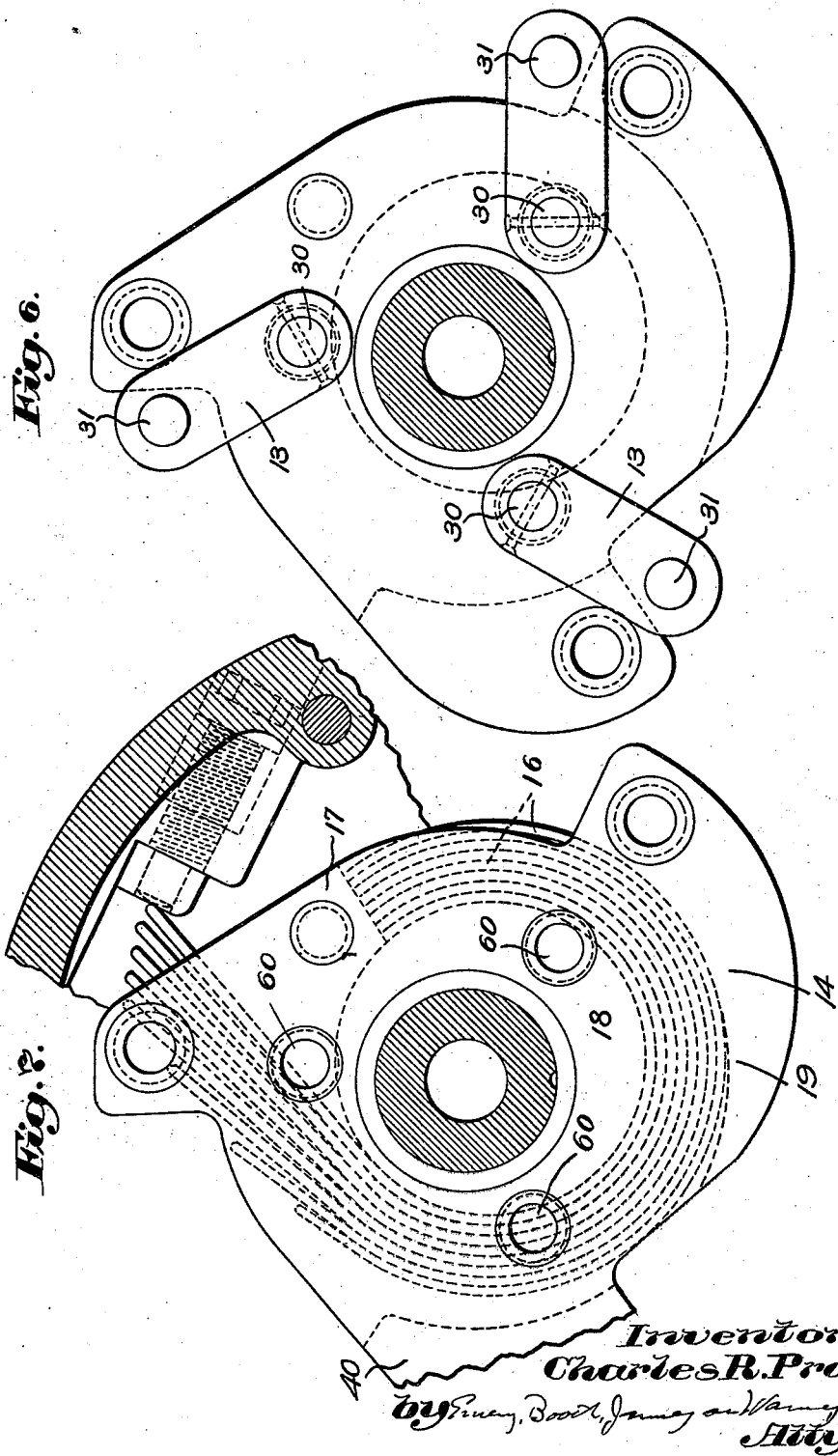

Patented Feb. 20, 1923.

1,446,063

UNITED STATES PATENT OFFICE.

CHARLES R. PRATT, OF MONTCLAIR, NEW JERSEY, ASSIGNOR TO THE E. HORTON & SON COMPANY, OF WINDSOR LOCKS, CONNECTICUT, A CORPORATION OF CONNECTICUT.

CHUCK.

Application filed June 4, 1920. Serial No. 386,493.

*To all whom it may concern:*

Be it known that I, CHARLES R. PRATT, a citizen of the United States, and a resident of Montclair, in the county of Essex, State of New Jersey, have invented an Improvement in Chucks, of which the following description, in connection with the accompanying drawings, is a specification, like characters on the drawings representing like parts.

This invention pertains to improvements in chucks and more particularly, though not exclusively, to improvements in work-holding chucks for lathes and the like. It is among the objects of the invention to provide a simple and efficient chuck.

In the drawings of the preferred form of my invention selected for illustrative purposes:—

Fig. 1 is a section, partly in elevation, through the longitudinal axis of a chuck, the section being on the line 1—1 of Fig. 2;

Fig. 2 is a section, partly in elevation, on the line 2—2 of Fig. 1, showing the chuck as assembled for external chucking;

Fig. 3 is a plan view of a preferred form of chuck-spider and spring shown in Fig. 1, the spider and spring being shown mounted on a spring-testing fixture;

Fig. 4 is an end elevation of the spring-testing fixture and superimposed parts shown in Fig. 3;

Fig. 5 is a plan view of a portion of the chuck showing the jaw slide construction;

Fig. 6 is a diagrammatic view showing the spider and toggles of the chuck as assembled for internal chucking;

Fig. 7 is a diagrammatic view showing an adjustment of the spring for relatively light work engaging pressure; and Fig. 8 is a front elevation of the chuck.

Referring to the drawings and to the preferred form of my invention selected for illustrative purposes, I have shown a chuck body 10, having slidably mounted on the face thereof work-gripping elements herein shown as the slide jaws 11 carrying top jaws 12 adjustably mounted thereon, as best shown in Figs. 1 and 5. The slide jaws 11 are movable to and from the work in guided relation to the chuck body 10, movement of the jaws toward the work being effected by resilient means, hereinafter more fully described, preferably acting through the toggles 13, as shown. The toggles 13 are, for external chucking, connected to the spider 14 at their outer ends and to the slide jaws 11 at their inner ends. The spider 14 may conveniently be journalled on the hub 15 of the chuck body and be arranged for limited oscillation thereabout, such oscillation actuated in one direction by resilient means herein typified by the spring 16, which may be of the leaf spring, cantilever type and having one end thereof secured to the spider 14 and the other end engaging the chuck body. The spring is preferably secured to the spider by having one end resting against the abutment 17 and by having its leaves held between bosses 18, 19 on the spider. The outer end of the spring may engage the chuck body in any suitable way but I prefer, as best shown in Fig. 2, to provide at this point means for "loading" or supplying an initial pressure to the spring. This "loading" or initial pressure applying device may take the form of a screw 20 adapted to press against the end 21 of the spring when adjusted by the operator. The degree of pressure of the jaws on the work will be in a measure determined by the initial pressure imparted by the initial stress applying means 20.

In the preferred form of my invention shown in the drawings, the spring 16 is stressed in operation in a direction tending to straighten the same, and one end thereof being secured to the spider and the other end being engaged with the chuck body, the tendency of the spring is to turn the spider relative to the chuck body in the direction of the arrow shown in Fig. 2.

In external chucking this moves the pivotal connections 30 between the spider 14 and the toggles 13 in a direction toward the center line of the jaw guides, thereby forcing the pivots 31 connecting the toggles 13 and the slide jaws 11 toward the axis of the chuck, so that the jaws 12 grip the exterior of the work. This pressure of the jaws on the work is spring-actuated. When it is desired to release the jaws from the work in external chucking, means is provided for rotating the spider 14 relative to the chuck body in a direction opposite that shown by the arrow in Fig. 2, thereby stressing the spring and retracting the work-gripping jaws from the work. The parts in the position shown in Fig. 2 are in work-releasing position. The preferred means illustrated in the drawings for actuating this reverse rotation or oscillation of the spider comprises screws 32 threaded in the chuck body and bearing against the spider in a generally tangential direction.

I will now describe the operation of the preferred form of my invention in external chucking. Assuming the parts are in the positions shown in Figs. 1 and 2, the top jaws 12 are adjusted on the slide jaws 11 by loosening of the top jaw securing screws 34 until the jaws all contact with the work, with the work as near as possible in the desired central position. The screws 34 are then tightened so that the top jaws 12 are rigidly secured to the slide jaws 11. The screws 32 are then backed out away from the spider 14 to permit the spider to be turned in the direction of the arrow shown in Fig. 2 by the reaction of the spring 16. As the spider turns, the toggles will force the jaws against the work. If the pressure of the jaws on the work is not sufficient, it may be increased by screwing inwardly the pressure adjusting screw 20, or, if it is too great, it may be relieved by adjusting said screw outwardly.

For repeat operations, it is only necessary to turn any one of the adjusting screws 32 inwardly a sufficient distance to oscillate the spider relative to the chuck body and thereby through the action of the toggles to release the work.

In the preferred form of my invention shown in the drawings, I have provided for maintaining more or less constant the pressure applied to the jaws by the spring acting through the toggles, notwithstanding variation in leverage provided by different angular positions of the toggles. I prefer to perform this, as shown, by varying the effective length of the spring, and I may conveniently perform this, as best shown in Figs. 2 and 3, by forming a wall 40 exterior to the spring against which the spring may lie progressively as it is straightened during the work-gripping operation. Thus as the toggle 13 assumes positions progressively nearer radial relative to the chuck body, the leverage of the toggle is increased, but during such movement the spring has unwrapped or straightened sufficiently progressively so that its point of bearing against the external support 40 will have advanced progressively toward the free end of the spring, thereby shortening the effective length of the spring and decreasing the pressure applied thereby as the favorable leverage of the toggles increases.

For internal chucking I change the connections between the toggles and the spider and between the toggles and the sliding jaws so that the connection between the spider and toggles are nearer the axis of the chuck than the connection between the toggles and jaws. I may conveniently effect reversal of the toggles pursuant to removal of the sliding jaws. In the construction illustrated, the sliding jaws are slidable in guides in the chuck body and must be withdrawn radially. This radial withdrawal cannot be effected while the connecting pivot or pin 30 connects the toggle and sliding jaw. I have, therefore, provided for removal of the pin 30, pursuant to removal of a pivot retaining key 50 slidable in a guide in the sliding jaw and adapted to be normally held in place by a spring-pressed pin or detent 51. In operation, the spring-pressed detent 51 is pressed inwardly by a pin or the like, after which the key 50 is withdrawn. The pivot 30 may then be withdrawn, after which the sliding jaw 11 and associated parts are withdrawn. The toggles may then be removed and reassembled with the pivots 31 entered in the holes 60. The slide jaws 11 are then reassembled and the removable pins or pivots inserted through the holes 61 in the slide jaws and into their bearings in the toggles. The key 50 is then reinserted and held in place by the detent 51. The top jaws or adjustable jaws 12 are now reassembled with the slide jaws and the chuck is ready for internal chucking, the spring reaction tending to move the jaws away from the axis of the chuck.

The toggle action for internal chucking is shown diagrammatically in Fig. 6.

In the preferred form of chuck illustrated, an oscillation of about eleven and one-half degrees gives complete opening and closing motion to the jaws, this motion for quantity production on repeat work preferably not exceeding $\frac{3}{16}''$ movement on each jaw. The release screws 32 may be turned by any suitable key and are preferably provided with stop bushings. The screws may be proportioned so that three full turns thereof will impart the full jaw-releasing movement, and as the jaws will normally contact with the work after only a portion of the outward movement of the screw is effected, a substantial portion of the movement of the screw in both directions will be free of the spider. When a screw 32 is screwed outwardly, the spring assists the turning thereof by pressing the spider against the end of the screw until the work is engaged by the jaws, after which the screw is entirely free of the spider. When the screw is screwed inwardly, it will move freely until it contacts with the spider, after which a relatively limited turning movement of the screw, usually not exceeding one revolution, will release the jaws. The pressure of the jaws on the work is determined by the spring, which may be adjusted by the screw 20, the key to which may be kept by the foreman. Therefore the workman, even if unskilled, cannot strain the chuck or the work by the application of too great work-gripping force.

The central bore 70 of the chuck may be used as an oil reservoir, and the body of the chuck packed with lubricating grease providing permanent and constant lubrication to the spring and other working parts.

I preferably omit the usual individual adjusting screws between the slide jaws and top jaws, thus avoiding backlash of the adjusting screws and also avoiding possible straining of the chuck by reason of too tight gripping of the work through these jaws.

Even where such adjusting screws are used, however, my spring mechanism provides a pressure-limiting feature which within limits prevents straining of the chuck or work by over-strenuous tightening of the top jaws.

If a very light spring pressure is desired, or great variation in the pressure supplied by the spring pressure adjusting mechanism, I may provide, as shown diagrammatically in Fig. 7 for the spreading apart of the leaves of the spring at their outer or free ends. This may be effected by differentially adjusting the springs about the axis of the chuck, either by grinding off the ends of the spring leaves at the larger or butt end of the springs, or by providing suitable shims under the butt ends of the spring leaves. In the form of spring illustrated, this may be done by proportionately lengthening the effective length of the spring leaves, the leaves nearer the inner portion of the spring being lengthened more than those adjacent the outer portion of the spring. Where this adjustment is used, or where a spring is used initially formed as provided for by this adjustment, the spring leaves come into operation either successively or in any desired progression, thus giving great flexibility to the range of gripping power available for use.

While I have shown and described a preferred form of one embodiment of my invention, it will be understood that changes involving omission, substitution, alteration and reversal of parts, and even changes in the mode of operation may be made without departing from the scope of my invention, which is best defined in the following claims.

Claims:

1. A chuck comprising, in combination, a body, jaws radially guided in said body, and a cantilever spring extending around the axis of the chuck and urging said jaws into work-engaging position.

2. A chuck comprising, in combination, a body, jaws, and a spring, and reversible transmission means between said spring and jaws whereby said spring by its reaction in a single direction may actuate said jaws into work-engaging position for either external or internal chucking.

3. A chuck comprising, in combination, a body, jaws, a cantilever spring, and reversible transmission means between said spring and jaws whereby said spring by its reaction in a single direction may actuate said jaws into work-engaging position for either external or internal chucking.

4. A chuck comprising, in combination, a body, jaws, a spring, and toggle means between said spring and jaws, said toggle means changeable to actuate movement of said jaws alternatively either toward or from the center of said chuck by spring-actuated movement.

5. A chuck comprising, in combination, a body, jaw means, toggle means connected to said jaw means, swinging means for swinging said toggle means to actuate said jaw means, said swinging means, jaw means and toggle means having provision for connecting said toggle means to said jaw means at a point nearer the axis of said body than the connection between said swinging means and said toggle means or, to actuate said jaws in the opposite direction, having provision for connecting said toggle means to said jaw means at a point further from the axis of said body than the connection between said swinging means and said toggle means.

6. A chuck comprising, in combination, a body, jaws, links connected to said jaws, oscillatory means for swinging said links toward radial position relative to the chuck body to apply work-engaging pressure to the jaws, and means whereby swinging of said links toward radial position may alternatively, as desired, actuate work-gripping movement in a direction either toward or away from the axis of said chuck body.

7. A chuck comprising, in combination, a body, jaws, a pivot fixed at a determined distance from the axis of the chuck, a connection to the jaw providing a pivot movable toward and away from the axis of the chuck, means operatively connecting said pivots, shifting means for shifting the relative position of said pivots to bring a line between their axes nearer a radius of the chuck body to grip the work, or further from a radius of the chuck body to release the work, relative shifting of said pivots effective, as desired, to effect gripping action of the jaws by their movement toward the axis of the chuck, or away from the axis of the chuck.

8. A chuck comprising, in combination, a body, a jaw, an oscillatory part, a toggle connecting to said jaw and said oscillatory part, means for rocking said oscillatory part to actuate said jaw through said toggle and means permitting change of the operative connection between said oscillatory part and said jaw, whereby movement of said part in a determined direction may actuate movement of said jaw either toward or away from the axis of the chuck.

9. A chuck comprising, in combination, a body, jaws, and toggle means for moving said jaws, said toggle means reversible to actuate said jaws for external or internal chucking operations while maintaining the leverage of said toggle means substantially the same for both operations.

10. A chuck comprising, in combination, a body, jaws, spring means, toggle means between said spring means and said jaws, said toggle means reversible to actuate said jaws for external and internal chucking operations by reaction of said spring means.

11. A chuck comprising, in combination, a body, jaws, spring means, toggle means between said spring means and said jaws, said toggle means reversible to actuate said jaws for external and internal chucking operations by reaction of said spring means while maintaining the leverage of said toggle means substantially the same for both operations.

12. A chuck comprising, in combination, a body, jaws, spring means, toggle means between said spring means and said jaws, said toggle means reversible to actuate said jaws for external and internal chucking operations by reaction of said spring means, while maintaining an increasing leverage from said toggle as the jaws approach the work during both internal and external chucking operations.

13. A chuck comprising, in combination, a body, jaws, spring means of arcuate shape, means for distorting said spring in the general direction tending to straighten the same, and means actuated by the reaction of said spring to its more arcuate shape tending to move said jaws into engagement with the work.

14. A chuck comprising, in combination, a body, jaws, a spring extending around the axis of said chuck, oscillatory means, toggles between said oscillatory means and said jaws, said spring urging said oscillatory means in a direction to move said jaws toward the work, and screws threaded in the chuck body and rotatable by a wrench entered through the periphery of the chuck, said screws adapted to press against said oscillatory means to oscillate the same against the pressure of said spring, thereby to retract the jaws from engagement with the work.

15. A chuck comprising, in combination, a body, a plurality of jaws, spring means urging said jaws toward the work and a plurality of independently operable means distributed around the periphery of the chuck body, any one of said means operable to retract all of said jaws from engagement with the work.

16. A chuck comprising, in combination, a body, a plurality of jaws, spring means urging said jaws toward the work and a plurality of independently operable screws distributed around the periphery of the chuck body, any one of said screws operable to retract all of said jaws from engagement with the work.

17. A chuck comprising, in combination, a body, a plurality of jaws, a spider, toggles between said spider and jaws, spring means urging said spider in one direction to move the jaws toward the work, and a screw for oscillating said spider in the opposite direction against the pressure of said spring.

18. A chuck comprising, in combination, a body, a plurality of jaws, a spider, toggles between said spider and jaws, spring means urging said spider in one direction to move the jaws toward the work, and screws distributed about the periphery of the chuck body for oscillating said spider in the opposite direction against the pressure of said spring, said screws moving axially on lines substantially tangent to the arcs of movement of the points of engagement between said screws and said spider.

19. In a chuck a body, jaws, a jaw-actuating spring, said spring curved around the axis of the chuck, and supporting means formed to shorten the effective length of the spring as the spring is stressed and to lengthen the effective length of the spring as the spring reacts toward its normal unstressed form.

20. A chuck comprising, in combination, a body, jaws, a spider, toggles between said spider and jaws, a spring having one end thereof secured to said spider and the other end thereof engaged with said body, and means for decreasing the reactive force of said spring as the leverage of said toggles is increased during spring-actuated movement of said spider to actuate said jaws toward the work.

21. A chuck comprising, in combination, a body, jaws, a spider, toggles between said spider and jaws, a spring having one end thereof secured to said spider and the other end thereof engaged with said body, and means on the spider for decreasing the reactive force of said spring as the leverage of said toggles is increased during spring-actuated movement of said spider to actuate said jaws toward the work.

22. A chuck comprising, in combination, a body, jaws, a spider, toggles between said spider and jaws, a spring having one end thereof secured to said spider and the other end thereof engaged with said body, and a curved retaining wall on the spider for decreasing the reactive force of said spring as the leverage of said toggles is increased during spring-actuated movement of said spider to actuate said jaws toward the work.

23. A chuck comprising, in combination, a body, jaws, a spider, toggles between said spider and jaws, a spring having one end thereof secured to said spider and the other end thereof engaged with said body, and an outer curved retaining wall on the spider for decreasing the reactive force of said spring as the leverage of said toggles is increased during spring-actuated movement of said spider to actuate said jaws toward the work.

24. A chuck comprising, in combination, a jaw, an oscillatory part, a toggle, and means for connecting said jaw and oscillatory part by said toggle in two alternate relationships, one for internal and the other for external chucking.

25. A chuck comprising, in combination, a jaw, an oscillatory part, a toggle, and means for connecting said jaw and oscillatory part by said toggle in two alternative relationships, one for internal and the other for external chucking, the point of connection of said toggle to said oscillatory part being more remote from the axis of the chuck when said toggle is assembled with its cooperating parts for external chucking than when assembled with its cooperating parts for internal chucking.

26. A chuck comprising, in combination, a jaw, an oscillatory part, a toggle, and means for connecting said jaw and oscillatory part by said toggle in two alternate relationships, one for internal and the other for external chucking, the point of connection of said toggle to said oscillatory part being more remote from the axis of the chuck when said toggle is assembled with its cooperating parts for external chucking than when assembled with its cooperating parts for internal chucking, and the point of connection of said toggle to said jaw being more remote from the axis of the chuck when said toggle is assembled with its cooperating parts for internal chucking than when said toggle is assembled with its cooperating parts for external chucking.

27. A chuck comprising, in combination, a jaw, an oscillatory part, a toggle, and means for connecting said jaw and oscillatory part by said toggle in two alternate relationships, one for internal and the other for external chucking, the point of connection of said toggle to said jaw being more remote from the axis of the chuck when said toggle is assembled with its cooperating parts for internal chucking than when said toggle is assembled with its cooperating parts for external chucking.

28. A chuck comprising, in combination, a body, jaws, a leaf spring for actuating said jaws into engagement with the work, said spring having the leaves at its moving end spread apart, said leaves approaching one another as stress is applied, whereby a variable increment of force is provided by said spring during reaction thereof.

29. A chuck comprising, in combination, a body, jaws, a leaf spring for actuating said jaws into engagement with the work, said spring having the leaves at its moving end spread apart, said leaves approaching one another as stress is applied, whereby a variable increment of force is provided by said spring during reaction thereof, and means for varying the spread between the leaves to regulate the said variable increment of force.

In testimony whereof, I have signed my name to this specification.

CHARLES R. PRATT.